(12) United States Patent
Miller et al.

(10) Patent No.: US 11,579,959 B2
(45) Date of Patent: Feb. 14, 2023

(54) SYSTEMS AND METHODS FOR MARGIN BASED DIAGNOSTIC TOOLS FOR PRIORITY PREEMPTIVE SCHEDULERS

(71) Applicant: Honeywell International Inc., Charlotte, NC (US)

(72) Inventors: Larry James Miller, Black Canyon City, AZ (US); Pavel Zaykov, Brno (CZ)

(73) Assignee: Honeywell International Inc., Charlotte, NC (US)

( * ) Notice: Subject to any disclaimer, the term of this patent is extended or adjusted under 35 U.S.C. 154(b) by 84 days.

(21) Appl. No.: 17/331,188

(22) Filed: May 26, 2021

(65) Prior Publication Data

US 2022/0382610 A1    Dec. 1, 2022

(51) Int. Cl.
*G06F 11/00* (2006.01)
*G06F 11/07* (2006.01)
*G06F 9/48* (2006.01)

(52) U.S. Cl.
CPC .......... *G06F 11/079* (2013.01); *G06F 9/4887* (2013.01); *G06F 11/0721* (2013.01); *G06F 11/0757* (2013.01); *G06F 11/0772* (2013.01)

(58) Field of Classification Search
CPC .............. G06F 11/079; G06F 11/0721; G06F 11/0757; G06F 11/0772; G06F 9/4887; G06F 9/4881
See application file for complete search history.

(56) References Cited

U.S. PATENT DOCUMENTS

| | | | |
|---|---|---|---|
| 6,110,220 A | 8/2000 | Dave et al. | |
| 8,438,572 B2 | 5/2013 | Fecioru | |
| 8,621,473 B2 | 12/2013 | Miller et al. | |
| 9,292,344 B2 | 3/2016 | Ryshakov et al. | |
| 10,768,984 B2 | 9/2020 | Varadarajan et al. | |
| 10,908,955 B2 | 2/2021 | Varadarajan et al. | |

(Continued)

FOREIGN PATENT DOCUMENTS

CN    109298917 A    2/2019

OTHER PUBLICATIONS

CAST, "Position Paper CAST-32A Multi-core Processors", Certification Authorities Software Team (CAST), Nov. 2016, pp. 1 through 23.

*Primary Examiner* — Philip Guyton
(74) *Attorney, Agent, or Firm* — Fogg & Powers LLC

(57) ABSTRACT

In one embodiment, a method for margin determination for a computing system with a real time operating system and priority preemptive scheduling comprises: scheduling a set of tasks to be executed in one or more partitions, wherein each is assigned a priority, wherein the tasks comprise periodic and/or aperiodic tasks; executing the set of tasks on the computing system within the scheduled periodic time window; introducing an overhead task executed for an execution duration controlled either by the real time operating system or by the overhead task; controlling the overhead task to converge on a point of failure at which a length of the execution duration of the overhead task causes either: 1) a periodic task to fail to execute within a deadline, or 2) time available for the aperiodic tasks to execute to fall below a threshold; and defining a partition margin corresponding to the point of failure.

20 Claims, 3 Drawing Sheets

(56) References Cited

U.S. PATENT DOCUMENTS

| | | | |
|---|---|---|---|
| 2003/0187907 A1* | 10/2003 | Ito | G06F 9/4887 718/102 |
| 2005/0034126 A1 | 2/2005 | Moore | |
| 2007/0083863 A1 | 4/2007 | Bril et al. | |
| 2008/0282246 A1* | 11/2008 | Dolev | G06F 9/4881 718/102 |
| 2014/0237476 A1 | 8/2014 | Steffen et al. | |
| 2014/0281088 A1* | 9/2014 | VanderLeest | G06F 9/4887 710/264 |
| 2015/0334173 A1* | 11/2015 | Coulmeau | H04L 67/10 709/203 |
| 2018/0039514 A1 | 2/2018 | Liao et al. | |

* cited by examiner

SYSTEMS AND METHODS FOR MARGIN BASED DIAGNOSTIC TOOLS FOR PRIORITY PREEMPTIVE SCHEDULERS

BACKGROUND

Safety-critical commuting systems, such as used for avionics applications, often employ space and time partitioning schemes used in conjunction with a real-time operating system (RTOS). The ARINC 653, avionics application standard software interface, is one such example. In ARINC 653 systems, partitions are scheduled by a priority preemptive scheduler to be executed in periodic windows (often referred to as "time slices", or just "slices"). Within these time slices, one or more processes (often referred to as "tasks") execute. These tasks share a time budget allocated to the partition by the scheduler. Each ARINC 653 task is assigned a task, although it may not have a specific execution time budget. The tasks can be periodic or aperiodic. At each scheduling point, the operating system determines the highest priority task that is ready to run, and schedules it. Once a task begins, it may continue to run until it completes its process or until the partition's time slice expires.

In such systems, it is difficult to tell how much of a margin is available in a partition after the scheduled tasks are run, because each frame of the partition will include different combinations of periodic tasks and aperiodic tasks that are enabled for execution in that frame. Tools may exist to show which tasks are executing in which time slice, and possibly the maximum utilization observed within a time slice. But such numbers can be misleading. The complexity of the interactions between tasks, and differences in execution cadence and process content in each time slice can make it difficult to determine how much actual margin exists within the partition because some slices may be half full while others are completely utilized based on which processes are enabled to execute during that time slice. Also, in some cases aperiodic tasks utilize 100% of the available time not utilized by periodic tasks, so no matter how much time the partition is given, the available execution budget will appear to be completely consumed.

For the reasons stated above and for other reasons stated below which will become apparent to those skilled in the art upon reading and understanding the specification, there is a need in the art for systems and methods for margin based diagnostic tools for priority preemptive schedulers.

SUMMARY

The Embodiments of the present disclosure provides systems and methods for margin based diagnostic tools for priority preemptive schedulers and will be understood by reading and studying the following specification.

In one embodiment, a method for margin based diagnostics for a computing system with a real time operating system and comprising a priority preemptive scheduler comprises: scheduling in a periodic time window a set of tasks to be executed in one or more partitions, wherein each task of the set of tasks is assigned a priority for execution within the one or more partitions, wherein the set of tasks comprises one or more of periodic tasks and aperiodic tasks; executing the set of tasks on the computing system within the scheduled periodic time window; introducing into a first partition of the one or more partitions at least one overhead task, wherein the at least one overhead task is executed within the first partition for an execution duration controlled either by the real time operating system or by the at least one overhead task; controlling the at least one overhead task in the first partition executing the set of tasks to converge on a point of failure at which a length of the execution duration of the overhead task causes either: 1) at least one periodic task to fail to execute within a defined periodic task deadline, or 2) time available for the aperiodic tasks to execute to fall below a predetermined threshold; and defining a partition margin as a function of the execution duration corresponding to the point of failure.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

Figure 1:
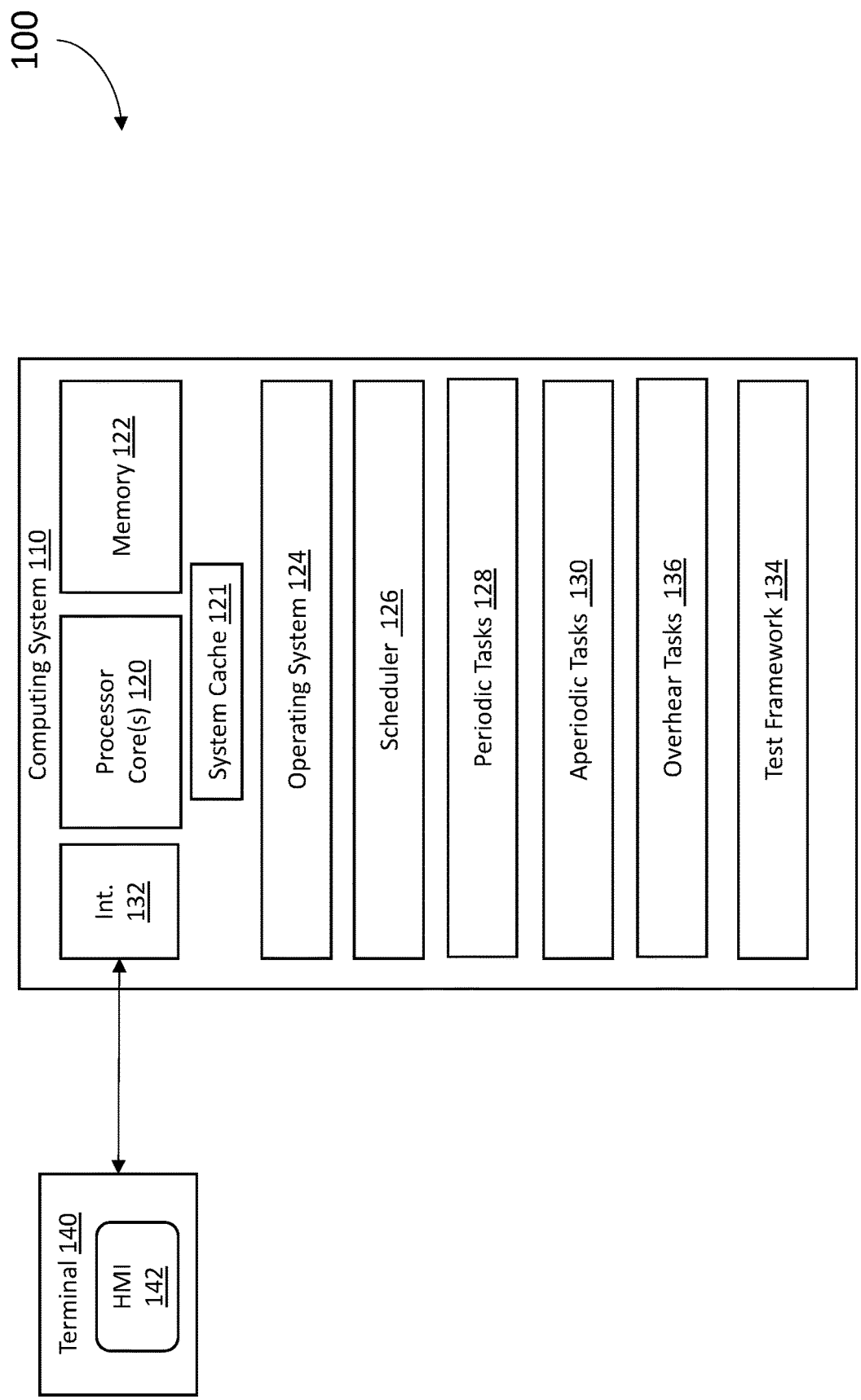
FIG. 1 is a block diagram of a diagnostic system that implements an example margin based diagnostic tool embodiment for a computing system that employs priority preemptive scheduling.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure provide a tool for determining partition margins and other parameters for priority preemptive scheduler computing systems. The tool introduces into the partitions of such systems a configurable overhead task that is adjusted to consume a specified duration of partition time (and thus compress the balance of remaining time available for tasks to run) in order to reveal partition margins and other parameters. These partition margins and other parameters indicate to a system developer (or other interested person) whether a system has adequate processing resources to complete the execution of tasks within specified deadlines as intended. As disclosed in greater detail below, the embodiments presented herein can be used in a priority pre-emptive scheduled system to: 1) assess a true partition margin; 2) simulate partition behavior (and the system effects that occur) as the timing margin within a partition degrades and eventually becomes inadequate; 3) verify appropriate partition error responses associated with a missed deadline; 4) influence task timing interactions within the partition (or a scheduler) via external stimulus as part of a robustness testing strategy to locate data passing vulnerabilities. Although the embodiments present here are useful for Arinc 653 systems, and may be discussed in the context of Arinc 653 related examples, it must be appreciated that these embodiments are not so restricted. Indeed these embodiments are applicable to, and may be implemented by, any computing system having priority pre-emptive scheduling.

As used herein a "major time frame" is a time window within which each partition is executed at least once. A "minor time frame" is a time window, or slice, allocated to each partition within a major time frame. Minor time frames are sequentially combined to form the major time frames. That is, a partition is a slice of time of the overall major time frame, where other partitions populate at least a portion of the major time frame. All processes, which are referred to herein as "tasks", comprise applications executed by the processor and are allocated time for execution and also assigned a priority. Once a task begins execution, it continues until it completes its process, it is stopped by the operating system, or until the minor time frame for the partition expires. It should be understood that any one partition may be assigned more than one minor time frame within a given major time frame. A partition may include for execution a set of periodic tasks and/or a set of aperiodic tasks. Periodic tasks associated with a partition are executed each time a minor time frame starts a partition. Aperiodic tasks are used to handle less time sensitive events and their execution may be distributed over multiple minor time frames. As a result, periodic tasks are typically assigned a higher priority than aperiodic tasks. When the execution window of a minor time frame terminates, the execution of a partition is preempted, and next partition in the major time frame starts to execute. Partitions that were previously preempted continue execution in the next minor time frame in which they are scheduled to occur, and tasks in those partitions re-executed in order of priority.

With embodiments of the present disclosure, a partition may further include for execution at least one "overhead task" whose duration, priority, and/or execution pattern, are be specifically controlled in order to determine margins and other parameters.

FIG. 1 is a block diagram of a diagnostic system 100 that implements a margin based diagnostic tool for a computing system 110 that employs priority preemptive scheduling. In the embodiment of FIG. 1, the diagnostic system 100 comprises a computing system 110 that includes one or more processing cores 120 coupled to a memory 122, a system cache 121, an operating system 124 and a scheduler 126 that implements priority pre-emptive scheduling for a set of periodic tasks 128 and/or aperiodic tasks 130 that are to be executed by the one or more processing cores 120. In some embodiments, the operating system 124 is a real-time operating system (RTOS) that facilitates the execution real-time applications to process data as it comes in within specified time constraints, referred to herein as "deadlines". The system 100 also includes a terminal 140 that has a human machine interface (HMI) 142.

With system 100, it can be determined how much margin is available in partitions executed by the processing cores 120 given the set of periodic tasks 128 and/or aperiodic tasks 130. The periodic tasks 128 and/or aperiodic tasks 130 may comprise the specific processes for an end-user that will be executed by the processor core(s) 120, which may be referred to as user-tasks. Accordingly, such end-users may be presented with test results indicating exactly how they can expect the computer system 110 to operate in the field for the purpose and/or intended use the computer system 110. In some embodiments, system 100 is implemented as a testing station for evaluating computer system 110 while executing prescribed sets of tasks over one or more partitions. In other embodiments one or more features of the system 100 presented herein may be fully implemented in production computer systems 110 delivered to the end-users.

The parameter of partition margin is an important factor to the end-users of computer system 110 for determining the adequacy of the computer systems 110 to meet their intended use. For example, in a safety-critical system, such used as on an aircraft or spacecraft, it may be important to know how close a system is to having one or more of its tasks potentially fail to meet a deadline. That is, when a partition is shown under testing to always complete its set of periodic tasks 128 and/or aperiodic tasks 130 using half of the partition duration or less (a margin of at least 50%), it has a substantially greater capacity to handle unexpected delays or extended execution times (for example, due to unforeseen events or conditions) than if that partition is shown under testing to typically complete its set of periodic tasks 128 and/or aperiodic tasks 130 with only a percent or two of the partition duration remaining.

Moreover, when this margin determination is separately ascertained for each of the partitions as sequentially executed by the system, a margin metric representing the capacity of the overall system to handle unexpected delays or extended execution times can be established. For example, the testing may determine that no partition executed by the system 110 has a margin of less than a given percentage. The end-user may then determine whether that overall margin metric provides them with enough reasonable assurance that the system 110 can handle anomalous events or conditions without causing the missing of a deadline. It should be appreciated that these embodiments herein are applicable to multi-partitioned systems (i.e., a plurality of partitions), but also to a system 110 that executes only a single partition (which may be considered as equivalent to a non-partitioned system).

The scheduler 126 that implements the priority pre-emptive scheduling may be characterized as a two level scheduler. The first level of scheduling defines the frequency at which slices (the minor time frames in which partitions are executed) are scheduled. For example, a slice associated with a given first partition may be scheduled to occur at a specified frequency. The periodicity of the slices may be expressed either in terms of frequency or time. For example, a slice that is scheduled to occur every 12.5 milliseconds (msec) may be referred to as either an 80 Hz frame, or a 12.5 msec frame. An 80 Hz frame is a frame that occurs 80 times each second, which is every 12.5 msec. Likewise, a 40 Hz frame is a frame that occurs 40 times each second, which is every 25 msec.

The second level of scheduling defines the frequency at which periodic tasks 128 are executed within the partitions, which may also be expressed in terms of a rate or time. An 80 Hz task is a process that is designed to execute 80 times each second so that it may compute and provide its output in time to meet a predefined periodic task deadline. A system or process that utilizes that task's output may need to receive an input that is frequently refreshed 80 times each second to operate. The periodic task deadline would indicate the time at which the data receiving system or process needs to receive the next iteration of output from the periodic task 128. The periodic task 128 providing that output would therefore be scheduled to execute at a sufficient periodicity to ensure that the periodic task deadline is met.

It is to be noted is that the scheduler 126 coordinates the first and second level scheduling in order for each periodic task to meet is specific periodic task deadline. That is, assuming that a slice is scheduled to occur at a frequency of $f_1$, then the fastest tasks schedule for execution in that slice are $f_1$ frequency tasks. For example, if a slice is an 80 Hz slice, then an 80 Hz task may be scheduled for execution each time that slice is executed, providing a sufficient frequency of execution for the periodic task to meet its periodic task deadline. For an 80 Hz slice, an 80 Hz task would run each slice, a 40 Hz task would run every other slice, a 20 Hz task would run every $4^{th}$ slice, a 10 Hz task would run ever $8^{th}$ slice. A 160 Hz task however (or anything larger than 80 Hz) would not be executed frequently enough to meet its periodic task deadline. In contrast, slower tasks may be schedule into the 80 Hz slice. A 40 Hz slice would have the potential to be successfully executed in either of the two 80 Hz slices that would occur before the 40 Hz task's periodic task deadline.

Within the context of a given partition, when (and whether) a periodic task 128 executes is also a matter of priority. That is, a given periodic task 128 will proceed to execution after all other higher priority tasks within the partition have completed execution. While it can be expected that higher frequency tasks would be assigned higher priorities than relatively lower frequency tasks (to ensure they execute before their more frequent deadlines), that need not always be the case so that having a relatively lower frequency task assigned a higher priority than a higher frequency tasks is possible. One or more aperiodic task 130 may also be executed within a partition, but they have no set frequency of execution. Instead, an aperiodic task 130 will run whenever it has the highest priority process of tasks remaining to be executed.

As mentioned above, embodiments of the present disclosure may be utilized for determining how much margin is available in a partition. Previously, determining how much margin is truly available in a partition is difficult because each frame of the partition will include different combinations of periodic task and aperiodic tasks that are enabled for execution in that frame. With embodiments of the present disclosure, at least one overhead task 136 is introduced into the partition whose duration, priority, and execution pattern is controlled in order to determine the amount of margin available in a partition. The execution duration, priority, and execution pattern, of the overhead task 136 may be controlled via the operating system 124, or controlled by the overhead task 136 itself. The margin determination is an indication of how much unutilized time remains in the partition after the scheduled periodic tasks 128 and aperiodic tasks 130 complete their execution. Ideally, the set of scheduled periodic and aperiodic tasks are the same tasks that will be executed by production system equipment as it will be used in service by the end-user.

In some embodiments, the partition (with its set of scheduled periodic and aperiodic tasks and the overhead task) is iteratively executed by the computer system 110 over a set of slices in order to determine that partition's margin. With each iteration, the execution duration of the overhead task 136 is varied (relative to the prior iteration) while the processor cores 120 execute the set scheduled periodic and aperiodic tasks in order of priority as described above. The execution duration of the overhead task 136 is controlled to converge on a point of failure at which the length of the execution duration of the overhead task 136 causes at least one of the periodic tasks to fail to execute within its defined period (i.e., before its periodic task deadline), or alternatively the execution duration of the overhead task 136 causes the remaining time available for the aperiodic processes to execute to fall below a predetermined threshold.

Note that the execution duration of the overhead task can be specified in terms of any convenient unit such as, but not limited to, a specific time duration (a number of microseconds), a number of processor cycles, or a percentage of a partition's duration. The execution duration can be determined from a pre-programed sequence, can be internally computed dynamically by the system 110, for example based on results of a prior iteration, operating condition of the system, and/or other variables. The execution duration of the overhead task 136 corresponding to the point of failure defines the determined margin for that partition.

In some embodiments, the execution duration of the overhead task 136 may be controlled manually by an operator of a terminal 140 utilizing a human machine interface (HMI) 142 or via a script executed on the terminal. The terminal 149 may be implemented by various means such as, but not limited to, a computer, laptop or tablet computer, or other equipment. The terminal 149 may be coupled to the computer system 110 via an interface 132. In various different embodiments, the interface 132 may be a wired or wireless interface and/or a network interface. The terminal 140 may be coupled to the interface 132 either directly, or indirectly such as through a proprietary or public network (such as the Internet, for example), or through some combination of these alternatives. In some embodiments, the features discussed herein attributable to the terminal 140 and/or HMI 142 may be integrated within the computing system 110 rather than being a discrete device.

Utilizing the HMI 142, an operator of the terminal 140 may enter parameters including the target partition where the overhead task 136 is to be introduced, and the desired duration of time that the overhead task 136 is to consume from the target partition and optionally an execution pattern. The format of the HMI 142 is not limited to any particular type. In some implementations, the HMI 142 may be text based, or present a simple dialog box having fields that accept input from the operator. In other implementations, the HMI 142 comprises a Graphical User Interface (GUI), or a command-line tool interface supplied by a vendor of the operating system 124 or by a platform software provider. The parameters entered by the operator into the HMI 142 may be passed to the operating system 126 and/or to the overhead task 136.

In some embodiments, the computing system 110 may include a test framework 134 executed by the one or more processor cores 120 that implements a platform partition framework. In some embodiments, the test framework 134 interfaces with the scheduler 126 to introduce the overhead task 136 into partitions and control parameters such as its execution duration, offset, and priority level within the partition, to implement the determination of partition margins and other parameters in the manners described herein. This platform partition framework also may be used to present a user interface to the operator via the HMI 142.

In some embodiments, the HMI 142 may receive from the operator parameters for a complete test sequence. For example, the parameters may include instructions to run the overhead task 136 over multiple iterations of the target partition, altering the duration of the overhead task 136 by some factor for each iteration, until the point of failure (a missed periodic task deadline, or where the remaining time available for the aperiodic processes to execute to fall below a predetermined threshold). The execution duration of the overhead task 136 corresponding to the point of failure defines the determined margin for that partition. Moreover, in other embodiments, an operator of the terminal may be omitted, and the testing sequence implemented entirely by a process of the operating system 124 (for example, using scripts), by the test framework 134, or by the overhead task 136 itself.

The character of what processing is performed by the overhead task 136 is not particularly important. For example, the overhead task 136 may merely comprise a dummy task such as a loop or null operation that executes until the specified execution duration of the overhead task 136 is reached. Alternatively, the overhead task 136 may involve a process having at least some utility to the system mission or operation of the computer system 110. The overhead task 136 may involve some maintenance process that supports the functions of the operating system 124. Here, the operating system 124 would select the maintenance process (or set of maintenance processes) as the overhead task 136 to introduce into the partition, and execute it for the specified execution duration. The overhead task 136 may also comprise one of a periodic or aperiodic tasks whose execution duration can be controlled such that it may be utilized as an overhead task 136 in the manner described herein.

A priority level may also be assigned to the overhead task 136 to influence where in the partition the overhead task 136 is run. In some embodiments, in order to ensure that the overhead task 136 is the first task to run in the partition, the operating system 124 may assign to the overhead task 136 a priority level that is higher than any other in that partition. In other embodiments, the operating system 124 may assign to the overhead task 136 a priority level that is intentionally lower than one or more of the periodic tasks 128 to ensure that those tasks are executed first, before the overhead task 136. In still other embodiments, the overhead task 136 may be distributed over a plurality of sub-tasks, each having different priority levels and individually assigned execution duration. This way, the delay caused by the overhead task 136 may be dispersed between two or more of the periodic, or aperiodic, tasks. In still other embodiments, the overhead task 136 can be controlled to place it at any offset from the start of the partition, including interrupting an already executing task. Such interruption of existing tasks may be controlled by the operating system 124.

Figure 2:
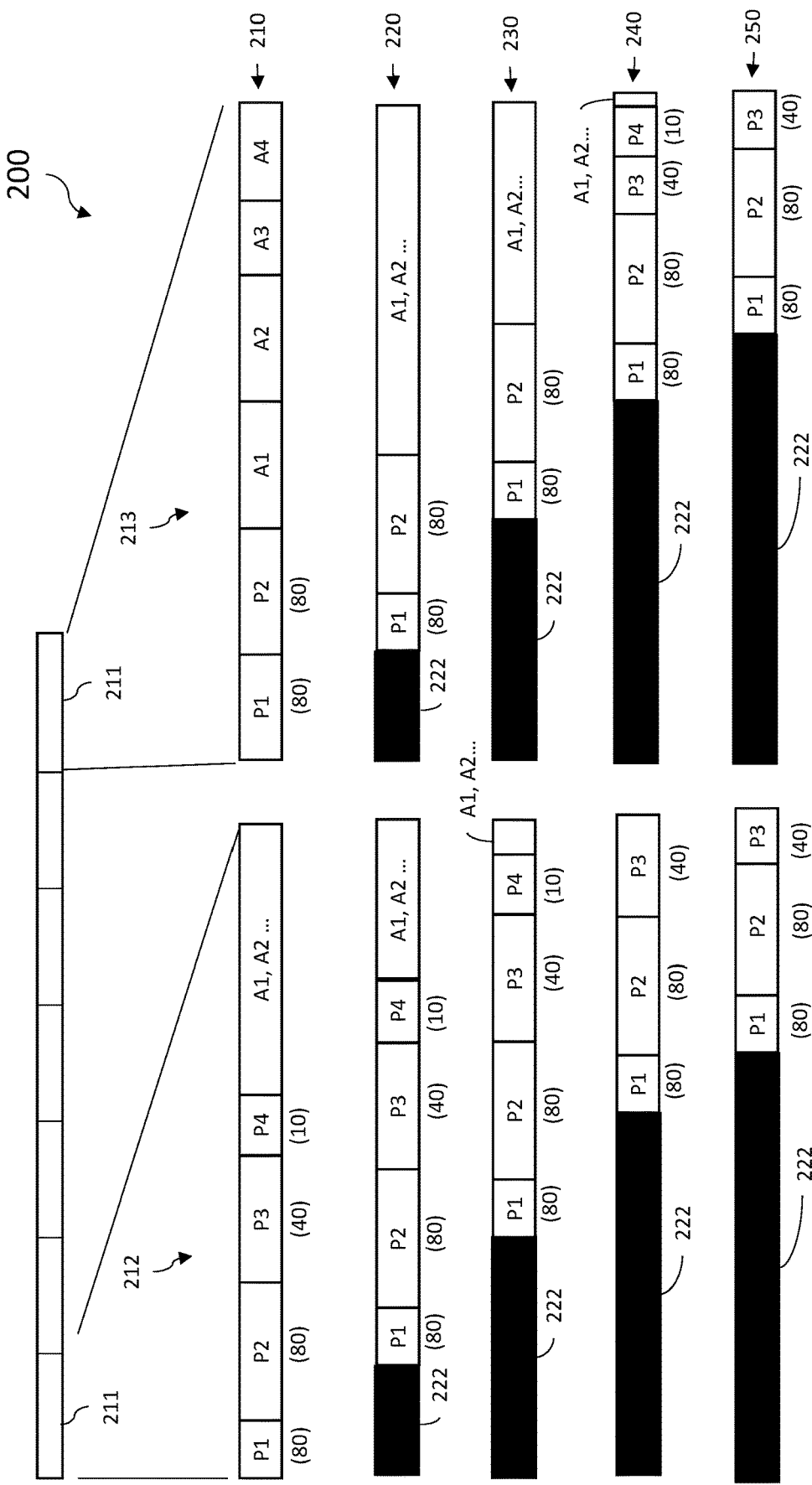
FIG. 2 is a diagram that illustrates a sequence of diagnostic test iterations utilizing an overhead task to implement a margin based diagnostic tool.

FIG. 2 illustrates at 200 a sequence of diagnostic test iterations illustrating the utilization of the overhead task as discussed above to determine the margin for an example partition executed by the computing system 110.

Beginning at 210, execution windows are shown for two execution periods, or instances, 212, 213 of a partition 211. In this example, the partition 211 is executed within an 80 Hz slice. That is, the partition 211 executes 80 times per second so that the start of the second execution instance 213 is 12.5 msec from the start of the first execution instance 212. In other embodiments, the partition 211 may have execution rate different from 80 Hz. For example, it may be executed in a 40 Hz slice, or other frequency slice.

Within the partition 211, two 80 Hz tasks are enabled to run by the scheduler 126 (shown at P1 and P2), one 40 Hz task is enabled to run (shown at P3) and one 10 Hz task is enabled to run (shown at p4). As already discussed above, for the two 80 Hz tasks to meet their respective periodic task deadlines, they will run in every instance of the 80 Hz slice. The 40 Hz task P3 has a less stringent periodic task deadline (twice as long as the 80 Hz tasks) and can complete its execution in either of the two instances of the 80 Hz slice without missing its deadline. The 10 Hz task P4 has an even less stringent periodic task deadline, and can complete its execution in either of the two instances of the 80 Hz slice shown in FIG. 2, or any of the next 6 instances of that 80 Hz slice (not shown) without missing its periodic task deadline.

After the periodic task P4 completes its execution in the first instance 212 of the 80 Hz slice 211, aperiodic tasks (shown as A1, A2 . . . ) execute in the order of priority until the scheduled execution time for the first instance of the 80 Hz slice expires. Other partitions in other slices will then be sequentially executed in the same manner. When it comes time for the second instance 213 of the 80 Hz slice to execute, both the P1 and P2 periodic tasks again run in order of priority, to meet their respective periodic task deadlines. Neither the P3 or P4 tasks need run during the second instance 213, because they completed their processes in the first instance 212 of the partition 211 and have already satisfied their respective periodic task deadlines for computing their output data. Although the aperiodic tasks are shown as consuming the balance of time in each instance of the partition, there may be instances where all aperiodic tasks enabled for that partition 21 are completed before expiration of the partition 211, leaving a block of idle time between the completion of the last aperiodic task and the expiration of the partition.

At 220, 230, 240 and 250, timelines of sequential execution iterations are illustrated. The execution windows for the two execution instances 212 and 213 of partition 211 are shown, together with an overhead task 222 that has now been introduced. Here, these timelines show how scheduling is impacted as increasing amounts of overhead are simulated within the partition by varying the execution duration of the overhead task. At 220, the execution duration of the overhead task 222 shifts the execution start times of the periodic tasks P1, P2, P3 and P4. However, they are each able to still complete their processes in both of the illustrated partition instances 212 and 213. Moreover, between the two displayed instances 212 and 213, ample time remains for running aperiodic tasks. At 230, the execution duration of the overhead task 222 further shifts the execution start times of the periodic tasks P1, P2, P3 and P4. These periodic tasks P1, P2, P3 and P4 are still each able to complete their processes within each partition to meet their periodic task deadlines. Only a small percentage of the first instance 212 remains for the execution of aperiodic tasks, but time is still available for aperiodic tasks in the second instance 213.

At 240, the execution duration of the overhead task 222 has now shifted the execution start times of the periodic tasks to the point where the periodic tasks P1 and P2 can still complete execution and meet their respective periodic task deadlines, however, periodic task P3 is interrupted and its execution is now split between the first instance 212 and second iteration 213. That said, P3 does complete execution in the second iteration 213 and therefore will meet its periodic task deadline. The periodic task P4 is shifted entirely out of the first instance 212 and instead is run in the second iteration 213. The aperiodic tasks are now being substantially starved with only a very small duration of time to execute. While the aperiodic tasks are relatively low priority tasks, there should be some assurance that the system will permit them to run to completion eventually. As such, a predetermined threshold may define a minimum acceptable time available for the aperiodic processes to execute, and when the overhead task 222 execution duration causes the amount of time available for the aperiodic processes to execute to fall below that predetermined threshold, that is considered a point of failure. The available partition margin may therefore be based on a function of the execution duration corresponding to when the point of failure occurred.

At 250, the execution duration of the overhead task has now shifted the execution start times of the periodic tasks to the point where the periodic tasks P4 has been pushed out of both the first and second iterations of the partition 211 and no time remains to run aperiodic tasks. As a 10 Hz periodic task, if P4 is similarly not afforded time to run and complete in any of the six iterations that following the second instance 213, then P4 will fail to meet its periodic task deadline, representing a point of failure. Periodic task P3 is interrupted and its execution is split between the first instance 212 and second instance 213. In both the first instance 212 and the second instance 213, P3 is pushed right to the end of the partition 211. P3 is a 40 Hz task. Accordingly, if it does not complete its execution prior to the expiration of the second instance 213 of partition 211, it will also fail to meet its periodic task deadline, representing a point of failure.

As illustrated by FIG. 2, the execution duration of the overhead task 222 can be adjusted to cause 1) the amount of time available for the aperiodic processes to execute to dwindle and eventually fall below a predetermined threshold, and 2) one or more of the periodic tasks fail to meet their period task deadline. One or both of these results can be designated as representing points of failure. The margin associated with the partition 211 would therefore be defined as the execution duration of the overhead process that corresponds to the first point of failure observed as the execution duration is gradually increased. The examples in FIG. 2 show the overhead task inserted by the scheduler 126 at the beginning of the partition. As previously discussed, the overhead task 222 could instead be injected anywhere within the partition's timeline (e.g., beginning, end, split between processes/tasks, scheduled at specific intervals, etc.). Furthermore, in an alternate implementation, the overhead task 222 may be enabled to run in just certain execution iterations of the partition 211 rather than in every execution iteration. For example, the overhead task 222 may be enabled to run in every other execution iteration, every third, every fourth, and so on.

In addition to determining partition margins, embodiments of the present disclosure can be utilized to ascertain other parameters of a priority pre-emptive scheduling computing system 110.

In some embodiments, the computing system 110 further comprises a system cache 121. When the system cache 121 is enabled (as it usually is) there is a cache effect as the processor core(s) 120 progresses from execution of one partition to the next. More specifically, the cache effect is manifested as a delay in the execution of tasks in the next partition. Each partition inherits the system cache 121 in the condition it was left by the prior partition. At the partition transition boundary, the new partition will purge the cache 121 of remnants from the prior cache, which can be a time consuming process that varies in duration depending on how and the extent to which, the prior partition utilized the cache 121.

For implementations where the computing system 110 forms part of a safety-critical system, the worst-case interference in task execution associated with cache pollution needs to be accounted for. With embodiments of the present disclosure, simulations of such inherited cache pollution conditions can be performed. In one embodiment, initial empirical data is collected that measures a worst case delay in partition execution time caused by a polluted cache inherited from a prior partition. That measured worst case delay value can then be used to set the execution duration of an overhead task introduced into a partition so that the effects of that delay on the execution of the periodic and aperiodic task scheduled for that partition can be observed and measured. For example, it may be observed whether a periodic task misses a deadline or whether time for executing aperiodic tasks is reduced below a threshold, due a polluted cache. In some embodiments, the measurements may be used to pad each partition's budget to account for the possible time impact of the worst-case polluted cache. In some embodiments, the simulation of inherited cache pollution may be combined with margin determination processes as discussed above. That is, an overhead task of an initial duration of the measured worst case cache delay is introduce into a partition, and then increased and interactively varied to converge on the point of failure. The margin given a worst case cache delay would then be defined as the execution duration of the overhead task corresponding to the point of failure, subtracting the initial duration corresponding to the worst case cache delay.

In some embodiments, introduction of the overhead task may be utilized to intentionally shift one or more of the periodic tasks 128 to cause them to fail to meet a periodic task deadline in order to determine the effects the missed deadline have on the system. This effect may be referred to as a deadline missed fault response. With each partition determined to have adequate margin, it is reasonable to expect that the computing system 110 will not ever miss a periodic task deadline. That said, in some embodiments, an overhead task of a specified execution duration can force a task to miss its deadline so that the system response may be observed, and the expected deadline missed fault response verified. For example, such testing may determine whether failing to meet a periodic task deadline generates the appropriate alarms, or initiates other appropriate responses such as restarting the task experiencing the fault, restarting the partition entirely, or initiating other processes. In some embodiments, the overhead task may be assigned an execution duration that consumes the entire period of the partition to determine the fault response when the deadlines for an entire partition of tasks are missed.

In some embodiments, introduction of the overhead task may be utilized to test multithread robustness. Latent bugs associated with multi-threaded designs can be difficult to find because they typically occur when a task is preempted (that is, when the partition ends prior to the task completing execution) within a very narrow window of time where the vulnerability exists. Such vulnerabilities can remain latent in software for long periods of time and may eventually be exposed when changes to the software are made later to add functionality, or under a very specific set of input and environmental conditions that rarely occurs. With embodiments of the present disclosure, the introduction of the overhead task can be used to shift the timing relationships between the periodic and/or aperiodic tasks, by shifting where they execute in time relative to one another. Controlling the execution duration of the overhead task can intentionally cause preemption at different points of task execution to identify the vulnerabilities and the window of time where they occurs. For example, the potential vulnerability may involve the ability of one task to pass data between itself and another task. Those tasks may be of the same frequency (e.g., a 40 Hz task passing data to another 40 Hz task) or of different frequencies (for example a 10 MHz task passing data to an 80 MHz task). Under nominal system operation, both tasks will complete their execution within a shared partition instance with adequate time to pass data. If there is a bug in either of the tasks affecting the passing of data, for example, where the 10 MHz task gets interrupted while passing data to the 80 MHz tasks, the occurrence of the incomplete data pass may go undetected. By adding the overhead task to the partition and adjusting its duration to force the 10 Hz task to the end of the partition to get interrupted, and fine tune the moment of interruption, it can be identified where in the execution of the task the passing vulnerabilities occurs. Since the 10 Hz task was unable to compete its execution, it would be enabled to try again by running in the partition's next time window where it will execute in turn after any higher priority tasks. The introduction of the overhead task can therefore be used to move the preemption point and catch problems associated with passing data.

Figure 3:
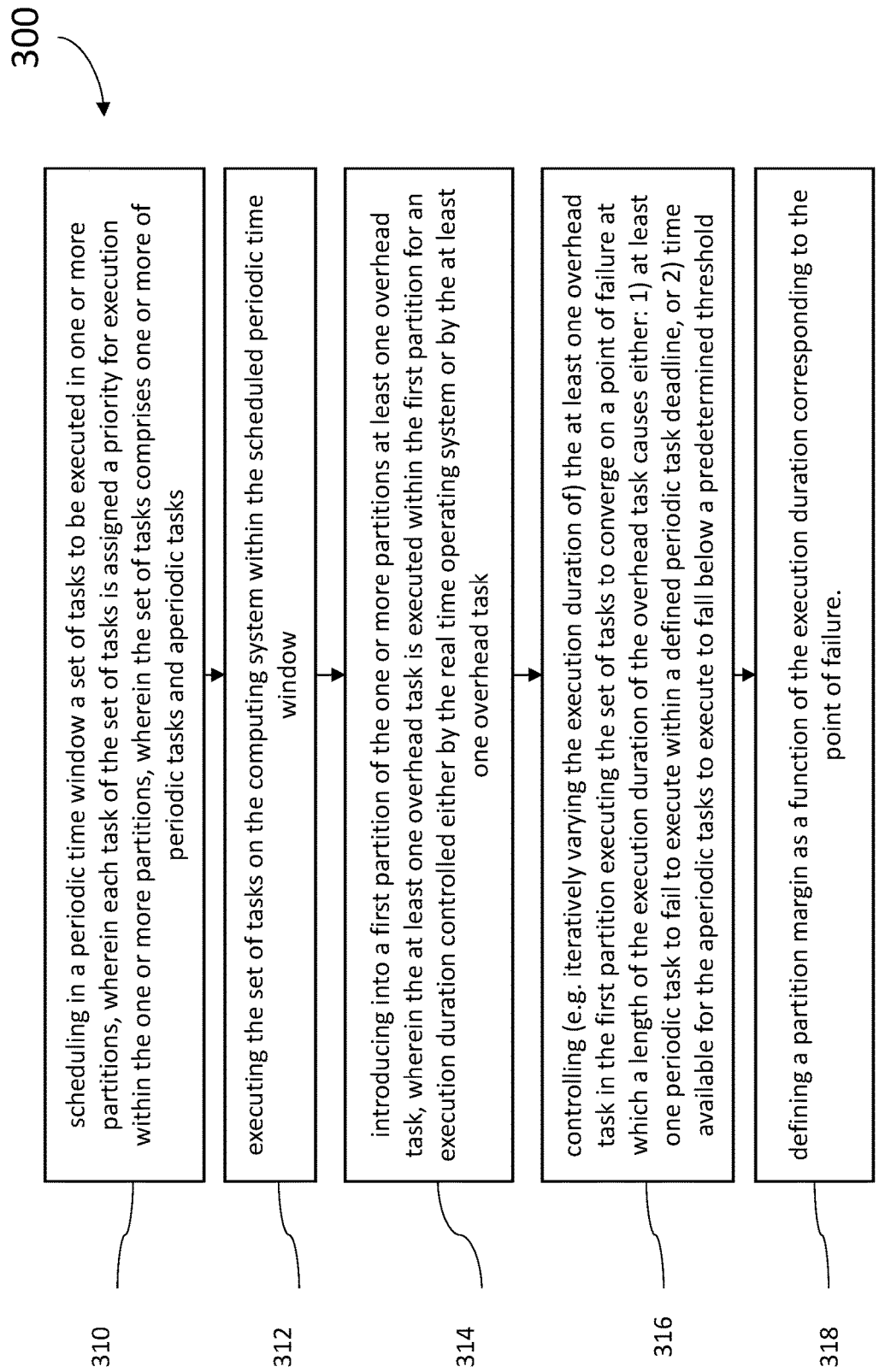
FIG. 3 is a flow chart diagram implementing a method for an example margin based diagnostic tool embodiment.

FIG. 3 is a flow chart diagram implementing a method 300 for a margin based diagnostic tool for a computing system comprising a priority preemptive scheduler. It should be understood that the features and elements described herein with respect to the method of FIG. 3 may be used in conjunction with, in combination with, or substituted for elements of any of the other embodiments discussed herein and vice versa. Further, it should be understood that the functions, structures, and other description of elements for embodiments described in FIG. 3 may apply to like or similarly named or described elements across any of the figures and/or embodiments describe herein and vice versa.

The method begins at 310 with scheduling in a periodic time window a set of tasks to be executed in one or more partitions, wherein each task of the set of tasks is assigned a priority for execution within the one or more partitions, wherein the set of tasks comprises one or more of periodic tasks and aperiodic tasks. Periodic tasks associated with a partition are executed each time a minor time frame starts a partition. Aperiodic tasks are used to handle less time sensitive events and their execution may be distributed over multiple minor time frames. When the execution window of a minor time frame terminates, the execution of a partition is preempted, and next partition in the major time frame starts to execute. Partitions that were previously preempted continue execution in the next minor time frame in which they are scheduled to occur, and tasks in those partitions are re-executed in order of priority. The method thus proceeds to 312 with executing the set of tasks on the processing system within the scheduled periodic time window. The tasks may be executed on a computing system that includes one or more processing cores coupled to a memory, an operating system and a scheduler that implements priority pre-emptive scheduling such as shown in FIG. 1. The operating system is a real-time operating system (RTOS) that facilitates the execution real-time applications to process data as it comes in within specified periodic task deadlines.

The method proceeds to 314 with introducing into a first partition of the one or more partitions at least one overhead task, wherein the at least one overhead task is executed within the first partition for an execution duration controlled either by the real time operating system or by the at least one overhead task. The overhead task is adjusted to consume a specified duration of partition time (and thus compress the balance of remaining time available for tasks to run) in order to reveal partition margins and other parameters. As such, the method proceeds to 316 with iteratively varying the execution duration of the at least one overhead task in the first partition executing the set of tasks to converge on a point of failure at which the length of the execution duration of the overhead task causes either: 1) at least one periodic task to fail to execute within a defined periodic task deadline, or 2) time available for the aperiodic tasks to execute to fall below a predetermined threshold. In other words, each time an iteration of the periodic time window is executed, the execution duration of the overhead task in the first partition is adjusted (which may include either increases or decreases in the execution duration of the overhead task) and over a series of the periodic time window execution, the point of failure is converged on. The method proceeds to 318 with defining a partition margin as a function of the execution duration corresponding to the point of failure. An output indicating the partition margin may be generated from a terminal coupled to the computing system, or by the computing system under test itself. It should be appreciated that in other embodiments, the method at 316 may instead more broadly comprise controlling the at least one overhead task in other ways than iteratively varying, such as by controlling the priority, placement, or distribution of the overhead tasks, to arrive at the partition margin.

The parameter of partition margin is an important factor to the end-users of computer system 110 for determining the adequacy of the computer systems 110 to meet their intended use. Moreover, when this margin determination is separately ascertained for each of the partitions as sequentially executed by the system, a margin metric representing the capacity of the overall system to handle unexpected delays or extended execution times can be established.

EXAMPLE EMBODIMENTS

Example 1 includes a method for margin based diagnostics for a computing system with a real time operating system and comprising a priority preemptive scheduler, the method comprising: scheduling in a periodic time window a set of tasks to be executed in one or more partitions, wherein each task of the set of tasks is assigned a priority for execution within the one or more partitions, wherein the set of tasks comprises one or more of periodic tasks and aperiodic tasks; executing the set of tasks on the computing system within the scheduled periodic time window; introducing into a first partition of the one or more partitions at least one overhead task, wherein the at least one overhead task is executed within the first partition for an execution duration controlled either by the real time operating system or by the at least one overhead task; controlling the at least one overhead task in the first partition executing the set of tasks to converge on a point of failure at which a length of the execution duration of the overhead task causes either: 1) at least one periodic task to fail to execute within a defined periodic task deadline, or 2) time available for the aperiodic tasks to execute to fall below a predetermined threshold; and defining a partition margin as a function of the execution duration corresponding to the point of failure.

Example 2 includes the method of Example 1, further comprising generating an output indicating the partition margin.

Example 3 includes the method of any of Examples 1-2, wherein controlling the at least one overhead task comprises iteratively varying the execution duration of the at least one overhead task.

Example 4 includes the method of Example 3, wherein when iteratively varying the execution duration of the at least one overhead task produces more than one point of failure, the partition margin is defined based on the execution duration corresponding to a first occurring point of failure.

Example 5 includes the method of any of Examples 3-4, wherein the execution duration of the at least one overhead task is based on empirical data representing a worst case delay in partition execution time caused by a polluted cache inherited from a prior partition.

Example 6 includes the method of any of Examples 1-5, wherein controlling the at least one overhead task comprises controlling the overhead task to execute either at a start of the first partition, or offset from the start of the first partition.

Example 7 includes the method of any of Examples 1-6, wherein controlling the at least one overhead task comprises distributing the overhead task within the first partition over a plurality of sub-tasks.

Example 8 includes the method of any of Examples 1-7, wherein the execution of the overhead task is adjusted to consume an entire execution time of the first partition for at least one time window.

Example 9 includes the method of any of Examples 1-8, wherein the overhead task comprise either: a dummy task, a loop operation, a null operation that executes until the execution duration of the overhead task is reached, a maintenance process that supports a function of the operating system, or one of the set of tasks.

Example 10 includes the method of any of Examples 1-9, wherein controlling the at least one overhead task comprises controlling execution of the overhead task within the first partition based on a priority level assigned to the overhead task.

Example 11 includes the method of any of Examples 1-10, further comprising: controlling the execution duration of the overhead task to cause a preemption at a point of task execution to identify a bug affecting passing of data between tasks of the set of tasks.

Example 12 includes the method of any of Examples 1-11, further comprising determining an effect of at least one missed periodic task deadline at the point of failure.

Example 13 includes a diagnostic system for margin based diagnostics for a computing system with priority preemptive scheduling, the system comprising: a computing system that includes: one or more processing cores coupled to a memory; a real time operating system; and a scheduler that implements priority pre-emptive scheduling for a set of tasks executed by the one or more processing cores, wherein the set of tasks comprises one or more of periodic tasks and aperiodic tasks; wherein the computing system is configured to: schedule and execute in a periodic time window the set of tasks in one or more partitions, wherein each task of the set of tasks is assigned a priority for execution within the one or more partitions; introduce into a first partition of the one or more partitions at least one overhead task, wherein the at least one overhead task is executed within the first partition for an execution duration controlled either by the real time operating system or by the at least one overhead task; control the execution duration of the at least one overhead task in the first partition to converge on a point of failure at which a length of the execution duration of the overhead task causes either: 1) at least one periodic task to fail to execute within a defined periodic task deadline, or 2) time available for the aperiodic tasks to execute to fall below a predetermined threshold; and define a partition margin as a function of the execution duration corresponding to the point of failure.

Example 14 includes the system of Example 13, further comprising a human machine interface, wherein the execution duration of the overhead task is controlled by an operator utilizing the human machine interface.

Example 15 includes the system of Example 14, wherein the human machine interface is configured to generate an output indicating the partition margin.

Example 16 includes the system of any of Examples 13-15, wherein the computing system is configured to control the at least one overhead task by iteratively varying the execution duration of the at least one overhead task.

Example 17 includes the system of Example 16, wherein computing system comprises a system cache, and wherein the execution duration of the at least one overhead task is based on empirical data representing a worst case delay in partition execution time caused by pollution of the system cache inherited from a prior partition.

Example 18 includes the system of any of Examples 13-17, wherein the computing system comprises at least one test framework that interfaces with the scheduler to introduce the overhead task into partitions and control the execution duration of the overhead task.

Example 19 includes the system of any of Examples 13-18, wherein the computing system is configured to control the at least one overhead tasks by controlling execution of the at least one overhead task within the first partition based on a priority level assigned to the overhead task.

Example 20 includes the system of any of Examples 13-19, wherein the computing system is configured to control the at least one overhead task by executing the at least one overhead task either at a start of the first partition, offset from the start of the first partition, or by distributing the at least one overhead task within the first partition over a plurality of sub-tasks.

In various alternative embodiments, system and/or device elements, method steps, or example implementations described throughout this disclosure (such the computing system, terminal, HMI, processing core(s), system cache, operating system, frameworks, interfaces, or any controllers, processors, circuits, or sub-parts thereof, for example) may be implemented at least in part using one or more computer systems, field programmable gate arrays (FPGAs), or similar devices comprising a processor coupled to a memory and executing code to realize those elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, terms such as computing system, terminal, HMI, processing core(s), system cache, operating system, frameworks, interfaces, refer to the names of elements that would be understood by those of skill in the art of avionics and transportation industries and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A method for margin based diagnostics for a computing system with a real time operating system and comprising a priority preemptive scheduler, the method comprising:
scheduling in a periodic time window a set of tasks to be executed in one or more partitions, wherein each task of the set of tasks is assigned a priority for execution within the one or more partitions, wherein the set of tasks comprises one or more of periodic tasks and aperiodic tasks;
executing the set of tasks on the computing system within the scheduled periodic time window;
introducing into a first partition of the one or more partitions at least one overhead task, wherein the at least one overhead task is executed within the first partition for an execution duration controlled either by the real time operating system or by the at least one overhead task;
controlling the at least one overhead task in the first partition executing the set of tasks to converge on a point of failure at which a length of the execution duration of the overhead task causes either: 1) at least one periodic task to fail to execute within a defined periodic task deadline, or 2) time available for the aperiodic tasks to execute to fall below a predetermined threshold; and
defining a partition margin as a function of the execution duration corresponding to the point of failure.

2. The method of claim 1, further comprising generating an output indicating the partition margin.

3. The method of claim 1, wherein controlling the at least one overhead task comprises iteratively varying the execution duration of the at least one overhead task.

4. The method of claim 3, wherein when iteratively varying the execution duration of the at least one overhead task produces more than one point of failure, the partition margin is defined based on the execution duration corresponding to a first occurring point of failure.

5. The method of claim 3, wherein the execution duration of the at least one overhead task is based on empirical data representing a worst case delay in partition execution time caused by a polluted cache inherited from a prior partition.

6. The method of claim 1, wherein controlling the at least one overhead task comprises controlling the overhead task to execute either at a start of the first partition, or offset from the start of the first partition.

7. The method of claim 1, wherein controlling the at least one overhead task comprises distributing the overhead task within the first partition over a plurality of sub-tasks.

8. The method of claim 1, wherein the execution of the overhead task is adjusted to consume an entire execution time of the first partition for at least one time window.

9. The method of claim 1, wherein the overhead task comprise either: a dummy task, a loop operation, a null operation that executes until the execution duration of the overhead task is reached, a maintenance process that supports a function of the operating system, or one of the set of tasks.

10. The method of claim 1, wherein controlling the at least one overhead task comprises controlling execution of the overhead task within the first partition based on a priority level assigned to the overhead task.

11. The method of claim 1, further comprising:
controlling the execution duration of the overhead task to cause a preemption at a point of task execution to identify a bug affecting passing of data between tasks of the set of tasks.

12. The method of claim 1, further comprising determining an effect of at least one missed periodic task deadline at the point of failure.

13. A diagnostic system for margin based diagnostics for a computing system with priority preemptive scheduling, the system comprising:
a computing system that includes:
one or more processing cores coupled to a memory;
a real time operating system; and
a scheduler that implements priority pre-emptive scheduling for a set of tasks executed by the one or more processing cores, wherein the set of tasks comprises one or more of periodic tasks and aperiodic tasks;
wherein the computing system is configured to:
schedule and execute in a periodic time window the set of tasks in one or more partitions, wherein each task of the set of tasks is assigned a priority for execution within the one or more partitions;
introduce into a first partition of the one or more partitions at least one overhead task, wherein the at least one overhead task is executed within the first partition for an execution duration controlled either by the real time operating system or by the at least one overhead task;
control the execution duration of the at least one overhead task in the first partition to converge on a point of failure at which a length of the execution duration of the overhead task causes either: 1) at least one periodic task to fail to execute within a defined periodic task deadline, or 2) time available for the aperiodic tasks to execute to fall below a predetermined threshold; and
define a partition margin as a function of the execution duration corresponding to the point of failure.

14. The system of claim 13, further comprising a human machine interface, wherein the execution duration of the overhead task is controlled by an operator utilizing the human machine interface.

15. The system of claim 14, wherein the human machine interface is configured to generate an output indicating the partition margin.

16. The system of claim 13, wherein the computing system is configured to control the at least one overhead task by iteratively varying the execution duration of the at least one overhead task.

17. The system of claim 16, wherein computing system comprises a system cache, and wherein the execution duration of the at least one overhead task is based on empirical data representing a worst case delay in partition execution time caused by pollution of the system cache inherited from a prior partition.

18. The system of claim 13, wherein the computing system comprises at least one test framework that interfaces with the scheduler to introduce the overhead task into partitions and control the execution duration of the overhead task.

19. The system of claim 13, wherein the computing system is configured to control the at least one overhead tasks by controlling execution of the at least one overhead task within the first partition based on a priority level assigned to the overhead task.

20. The system of claim 13, wherein the computing system is configured to control the at least one overhead task by executing the at least one overhead task either at a start of the first partition, offset from the start of the first partition, or by distributing the at least one overhead task within the first partition over a plurality of sub-tasks.

* * * * *